United States Patent
Kruse

(10) Patent No.: US 6,739,950 B1
(45) Date of Patent: May 25, 2004

(54) PIPE RENOVATING SYSTEM AND METHOD

(76) Inventor: Joerg Kruse, 8272 El Paseo Grande, La Jolla, CA (US) 92037

(*) Notice: Subject to any disclaimer, the term of this patent is extended or adjusted under 35 U.S.C. 154(b) by 0 days.

(21) Appl. No.: 10/316,255

(22) Filed: Dec. 9, 2002

(51) Int. Cl.[7] .................................................. B24B 1/00
(52) U.S. Cl. ........................ 451/37; 451/28; 451/36; 451/38; 451/75; 451/76; 451/87; 451/91; 451/99
(58) Field of Search .............................. 451/28, 36, 37, 451/38, 75, 76, 87, 91, 99

(56) References Cited

U.S. PATENT DOCUMENTS

| | | |
|---|---|---|
| 1,890,164 A | 12/1932 | Rosenberger |
| 2,087,694 A | 7/1937 | Malmros |
| 2,298,775 A | 10/1942 | Raiche |
| 2,497,021 A | 2/1950 | Sterns |
| 3,139,704 A | 7/1964 | McCune |
| 3,139,711 A | 7/1964 | Soderberg, Jr. |
| 3,151,418 A * | 10/1964 | Powell et al. .................. 451/76 |
| 3,286,406 A | 11/1966 | Ashworth |
| 3,485,671 A | 12/1969 | Stephens |
| 3,608,249 A | 9/1971 | Sullivan |
| 3,835,587 A | 9/1974 | Hall, Jr. |
| 4,005,549 A | 2/1977 | Perry |
| 4,333,277 A | 6/1982 | Tasedan |
| 4,579,596 A | 4/1986 | Murzyn |
| 5,007,461 A | 4/1991 | Naf |
| 5,045,352 A * | 9/1991 | Mueller ........................ 427/235 |
| 5,046,289 A | 9/1991 | Bengel et al. |
| 5,231,804 A * | 8/1993 | Abbott ......................... 451/76 |
| 5,460,563 A | 10/1995 | McQueen, Jr. |
| 5,499,659 A | 3/1996 | Naf |
| 5,622,209 A | 4/1997 | Naf |
| 5,924,913 A | 7/1999 | Reimelt |

FOREIGN PATENT DOCUMENTS

| | | |
|---|---|---|
| DE | 3821558 A1 | 12/1989 |
| EP | 0 299 134 | 2/1988 |
| EP | 0 393 433 A2 | 4/1990 |
| EP | 0 511 790 A1 | 7/1993 |
| EP | 0 634 229 A1 | 7/1994 |
| EP | 0 637 737 A1 | 7/1994 |
| GB | 2140377 A | 11/1984 |
| JP | 58-22663 A | 4/1983 |
| RU | 116040 | 2/1959 |

OTHER PUBLICATIONS

American Pipe Lining, Inc. brochure, In Place Pipe Restoration, date unknown.

* cited by examiner

*Primary Examiner*—Lee D. Wilson
*Assistant Examiner*—Shantese McDonald
(74) *Attorney, Agent, or Firm*—Gordon & Rees LLP

(57) ABSTRACT

A pipe renovating method and system is described, in which a pipe is first cleaned and then coated with a suitable coating material. In the cleaning step, pressurized air and particles of abrasive material are pumped into a first end of a pipe while suction is applied to the second end of the pipe via a vacuum pump to improve flow along the entire length of the pipe. The coating material is subsequently pumped in at one end of the cleaned pipe while suction is applied at the other end.

21 Claims, 2 Drawing Sheets

PIPE RENOVATING SYSTEM AND METHOD

BACKGROUND OF THE INVENTION

The present invention relates to a system and method for renovating pipes by removing accretions or build up in the pipes and then coating the pipes with a coating material.

All types of pipes, such as water pipes, gas pipes, sewer pipes, industrial fuel, chemical manufacturing plant pipes, and the like, are susceptible to build up of accretions or scale on the inner surface of the pipe. One of the reasons for this is corrosion or rust of the pipe surface. Another reason for scale build-up is the deposit of accretions from the material flowing through the pipe onto the pipe surface, such as lime or other deposits of solids from water in a water pipe. These accretions lead to a narrowing of the pipe diameter, reducing the throughput, and the formation of pits, ultimately jeopardizing the pipe integrity and leading to premature failure of the pipe system.

Renovating existing pipes will reduce the need for a complete or partial replacement of a piping system. This is of great advantage where pipes are installed below the ground, inside walls, or in shafts. The only thing that needs to be done is to dismount the instruments and devices at each end of the pipe and to mount them again after the pipe is cleaned and coated. Various pipe renovating systems and methods have been proposed in the past. In some cases, compressed air carrying particles of abrasive material is blown through the pipe. Such a method is described, for example, in U.S. Pat. No. 5,924,913 of Naf. The interior of the pipe is subsequently coated with an adhesive resin, such as an epoxy resin, which is also applied by use of compressed air to blow it through the pipe.

Processes using compressed air in this way can only be used on relatively small diameter pipes, and this cleaning technique can easily result in blocking of the pipe, or major leaks in the pipe when weakened after cleaning by constant high pressure. Pipes may not be adequately cleaned by such a method when major frictional resistance occurs in the pipe system.

U.S. Pat. No. 5,924,913 of Reimelt attempts to overcome these problems. In this method, cleaning abrasives are moved back and forth in the pipe by means of an alternating pressure drop. This may be done by alternately applying a vacuum to opposite ends of the pipe, or alternately supplying compressed air to opposite ends of the pipe. However, this technique can also result in blockages. When an abrasive agent is repeatedly moved back and forth, it will gradually become mixed with the accretions removed from the pipe surface, diluting or reducing the cleaning effect.

SUMMARY OF THE INVENTION

It is an object of the present invention to provide a new and improved method and apparatus for renovating pipes.

According to one aspect of the present invention, a pipe renovating method is provided, which comprises the steps of:

supplying a mixture of pressurized gas and particles of abrasive material to a first end of a pipe; and simultaneously applying suction to a second end of the pipe;

whereby the mixture of gas and abrasive material is pumped in at the inlet end and sucked out at the discharge end.

In an exemplary embodiment, the inlet end of the pipe is connected to a compressor and a supply of abrasive material, while the outlet end is connected to a vacuum pump. This has the advantage that increased gas flow is achieved by the combination of pressure at one end of the pipe and vacuum at the other, reducing the risk of blockages and eliminating or reducing the problem of loss of pressure at bends or elbows in the pipe, since the gas is being pulled through such obstructions by the vacuum even though pressure will be lost. The combination of blowing in air or other gas at one end of the pipe and sucking out the gas or air at the other end of the pipe may be called "vacuum acceleration." Even though the pressure at both the intake side and the discharge side may be well below the maximum pressure permitted for safety purposes, the particles and gas can still be transported at high speed throughout the entire pipe or pipe system using this "push and pull" method.

The pipe may be dried prior to the abrasive treatment, by blowing heated air through the pipe. A liquid coating material may be applied to the surface of the pipe after cleaning in a similar manner, simply by replacing the supply of abrasive material with a supply of coating material. The coating material is then conveyed through the pipe by blowing it in at one end and sucking it out at the other end. The pipe may be heated after the cleaning is complete and prior to applying coating material, in order to improve the flow characteristics of the liquid coating. The combination of pressure at the intake end with vacuum applied at the discharge end (push and pull) applies a high air or gas volume and speed, transporting the coating material, such as epoxy, through the pipe quickly and evenly. This eliminates or reduces variations in epoxy distribution, such as uneven thickness or missed areas which can arise when only pressure or only vacuum is used.

According to another aspect of the present invention, a system for renovating of pipes is provided, which comprises a supply of pressurized gas for connection to a first end of a pipe, a supply of abrasive particulate material for mixing with the pressurized gas, and a vacuum pump for connection to a second end of the pipe, whereby the abrasive material is blown into the pipe at one end and sucked out of the pipe at the other end.

An air heater may also be connected between the gas supply and first end of the pipe, and a coating material supply may be provided to replace the abrasive material supply when the pipe has been sufficiently cleaned, so as to coat the interior of the cleaned pipe with a layer of coating material such as epoxy. A filter is provided at the second end of the pipe for filtering the separated accretions from the pipe from the abrasive material.

The pipe renovating system and method of this invention allows pipe systems to be cleaned and coated more effectively than in the past, and also allows pipes of much larger diameter to be cleaned and coated. The combination of push at one end and pull at the other end of the pipe will reduce the effect of fall off of pressure half way along the pipe or at bends or elbows, and will move a larger volume of air at a higher speed through the pipe than would be possible by application of pressure or vacuum alone. This will clean and coat pipes more reliably and uniformly, and reduce the risk of blockages or pipe blow outs.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which.

DETAILED DESCRIPTION OF THE DRAWINGS

The drawings illustrate a system and method for renovating pipes according to an exemplary embodiment of the invention. The method may be used for renovating pipes of any size, length, or arrangement, in any type of pipe system, including water pipes, gas pipes, sewer pipes, oil pipes, pipes in chemical plants, and the like. This will prolong the lifetime of a pipe system and reduce or avoid the expense of replacing all or part of a pipe system.

Figure 1:
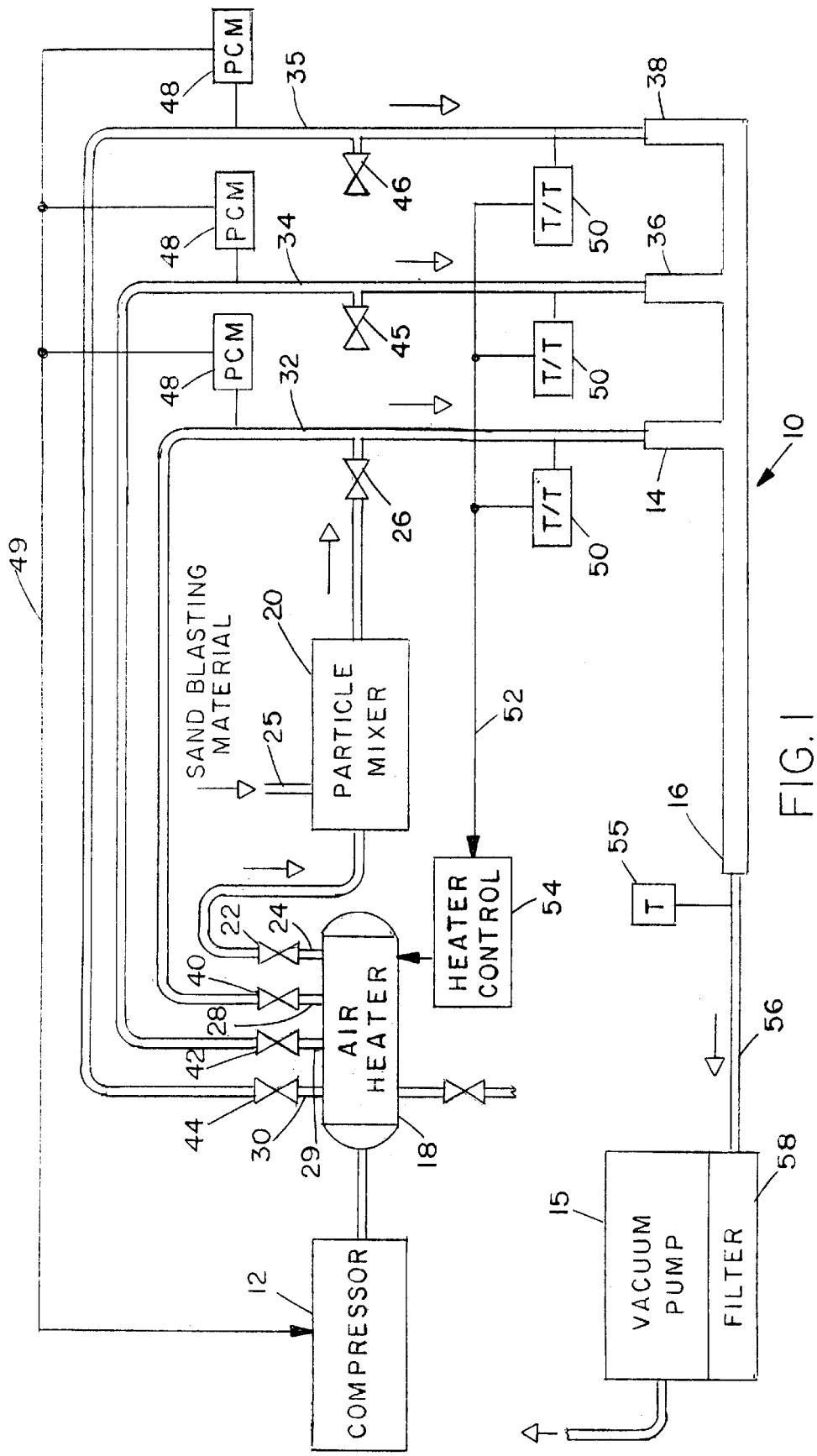
FIG. 1 is a block diagram illustrating the pipe cleaning stage of the method according to an exemplary embodiment of the invention.
Figure 2:
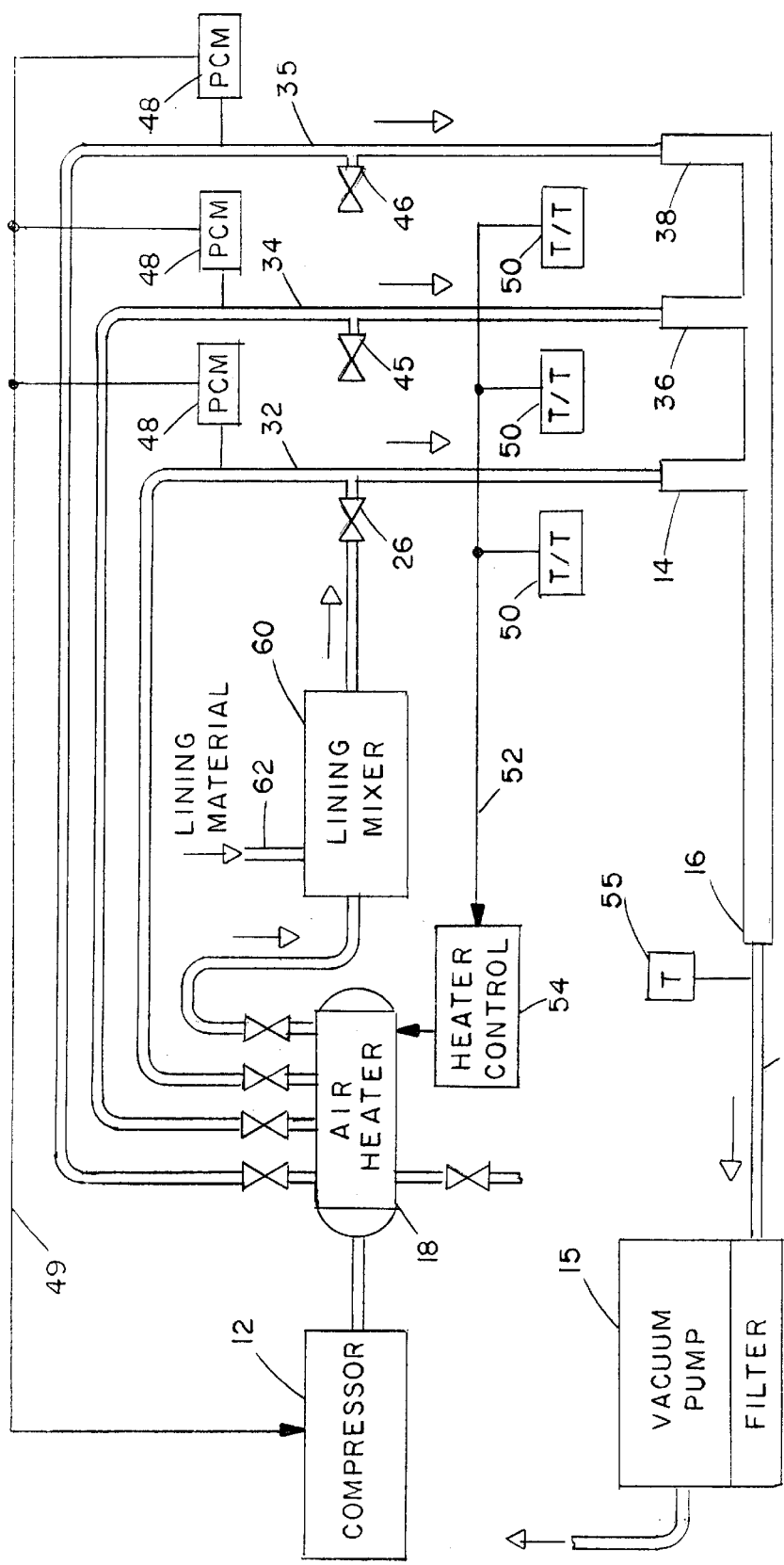
FIG. 2 is a block diagram illustrating the subsequent, pipe coating stage.

FIGS. 1 and 2 illustrate a simplified view of part 10 of a pipe system to be renovated. It will be understood that a typical pipe system will include joints, bends, elbows, connections, and the like, which are not illustrated in the drawing. FIG. 1 illustrates the pipe cleaning stage of the method, while FIG. 2 illustrates the pipe coating stage.

The basic steps of the method are removal of the various fixtures or devices connected to a pipe system, connection of the pipe renovation system to the pipe ends, drying the pipe, cleaning the pipe, heating the pipe with pre-heated air, coating the pipe with a coating material, and then reconnecting the fixtures to the pipe ends. FIGS. 1 and 2 illustrate all of the components needed to carry out these steps in an exemplary embodiment. The system as illustrated in FIG. 1 basically comprises a compressor 12 for providing a supply of air under pressure to a first intake or end 14 of the pipe system 10, and a vacuum pump 15 connected to a second end 16 of the pipe system 10. It will be understood that the pipe system in FIG. 1 is a simplified system for illustration purposes, and that a typical pipe system for renovation will be more complex, with more pipe fittings, bends, elbows, and junctions. However, the same basic system may be adapted for any pipe arrangement. An air heater 18 is connected to the outlet of the compressor 12, and a particle mixer or revive machine 20 is connected via a valve 22 to a first outlet 24 of the machine 18. Machine 20 has an inlet 25 for receiving sand-blasting material or abrasive granulate material, such as a chemically inert non-metallic mineral, emery, quartz, sand, glass, metal particles, or the like. The outlet of machine 20 is connected via valve 26 to the intake 14, in the pipe cleaning condition illustrated in FIG. 1.

The air heater 18 also has outlets 28,29,30 connected via lines 32,34,35, respectively, directly to three different intakes 14, 36,38 of the pipe system part 10, with valves 40,42, 44 controlling the connection of the respective heater outlet to the pipe system intake, as discussed in more detail below. Valves 45,46 in lines 34,35 allow the pressurized air and granulate material from machine 20 to be selectively supplied to the other two intakes 36,38 of this part of the pipe system. It will be understood that a greater or lesser number of lines and valves will be used if the pipe system has more or less intakes or ends to which fixtures or armatures were previously connected.

A separate pressure control manometer (PCM) 48 is connected to each of the connecting lines or hoses 32,34,35, and each PCM is connected to a control input of compressor 12 via control line 49, such that the compressor is automatically shut down if the pressure detected exceeds a predetermined safety level. A separate thermometer with thermostat (T/T) 50 is also connected to each of the hoses 32,34,35 to detect the temperature at that point in the hose, just prior to the respective intake 14, 36, 38. Each thermostat 50 is connected by a control cable 52 to a heater control unit 54, which in turn controls the operation of the air heater 18. A thermometer 55 is also connected to the hose 56 at the outlet end. Vacuum pump 15 has an inlet filter 58 for filtering particles above a certain size from the mixture flowing out of outlet 16.

In order to clean a pipe system, the armatures and/or fixtures connected to part of the pipe system are first disassembled, and the pipe cleaning system is then connected to opposite ends of part of the pipe system as indicated in FIG. 1. Initially, the pipe system and incrustations are dried by heating with heated air from the air heater 18. This is done by closing valves 22 and 26, and opening valves 40,42,44 so that heated air is blown through each of the pipe intakes 14,26,38 and through the pipe system 10 to the outlet end 16. Heated air will be blown in through each pipe intake, and will be pulled or sucked out at the other end 16 by the vacuum pump 15. If the pipe is not dried before blowing through the dry granulate material, there is a risk that the dry granulate will become moist and tend to clump together, potentially blocking the pipe. Additionally, the drying of any encrustations or deposits on the inner wall of the pipe will make such encrustations looser and easier to remove. The pipe system is dried with dehumidified, preclarified air, at a temperature of 50° C. or 120° F. above the surrounding ambient temperature.

After the drying step is completed, valve 40 is closed, and valves 22 and 26 are opened, so that pressurized air carrying the abrasive, sand blasting material particles is blown into the intake 14. At the same time, heated air is also blown in to intakes 36 and 38 via lines 34,35, to prevent any back flow of the abrasive particles. The vacuum pump 15 operates simultaneously to pull the air and particles through the pipe part 10. By blowing in air at the intake side and simultaneously applying a vacuum at the outlet or suction side to suck air out at the outlet side, the pressure at each end of the pipe does not have to be as high as would be necessary if vacuum alone or a pressure drop at one end only of the pipe were applied. The "push and pull" method illustrated in FIG. 1 is a vacuum acceleration technique, and reduces the drop off in pressure which would otherwise be encountered at pipe fittings, bends, elbows, or partial blockages of the pipe. The air volume is blown in at one end at a high velocity, and sucked out at the other end at an equivalent velocity. In this way, the pressure at both the intake side and the outlet side can be far below the maximum safety level, such as 15 PSI, while still acting to transport the air and abrasive particles at very high speed. The pressure control monitors will operate to automatically open a pressure relief valve if the pressure exceeds 15 PSI (or any other preset safety level, depending on the pipe system).

The abrasive particles blown through the pipe will hit the inner wall of the pipe at high velocity, tending to loosen and strip off any accretions or incrustations which have built up on the pipe surface. Not only are the accretions removed, but the high velocity, high volume of air will tend to heat up the pipe. The abrasive material used may be any kind of airborne particles which are harder than the inside accretions to be removed. In the case of water pipes, the particles must be of a mineral that poses no health risks and is approved for use in water pipes. In this case, the particles will have a grain diameter in the range from #5 mesh to #250 mesh (U.S. standard sieves). Suitable particles include chemically inert, non-metallic minerals, emery, quartz sand, or metal particles, particularly ferromagnetic particles. In an exemplary embodiment of the invention, the abrasive material used was Emerald Creek Garnet, produced by Emerald Creek Garnet Co. of Idaho, U.S.A.

It has been found that the combination of pressure and vacuum at opposite ends of a pipe section provide the air flow and volume needed to adequately clean the inside of the pipe and to reduce the risk of blockages. Additionally, the filter built in to the vacuum pump at the outlet end will remove the grit or sand blasting materials from the air, so that the material may be re-used until its abrasive properties are lost. The abrasive particles will tend to spiral around the pipe as the air is blown through the pipe, such that they are blown onto the wall and will tend to strip of accretions or deposits which have built up inside the pipe.

The following table indicates a suitable air volume/flow rate for adequate cleaning of pipes of different diameters, in the range of 0.5 to 8 inches, although larger diameter pipes can also be effectively cleaned by means of an increase in air volume and flow. Thus, for a 2 inch diameter pipe, around 270 cubic feet of air per minute will be the desired air flow rate for pipe cleaning purposes.

TABLE 1

Air Volume per Minute for Different Diameter Pipes

| Pipe Size (inches) | CFM | Decimal of Inches | Gals. In Lineal Foot |
|---|---|---|---|
| 0.5 | 15.8125 | 0.5 | 0.0158 |
| 0.75 | 42.95 | 0.75 | 0.0277 |
| 1 | 69.6 | 1 | 0.0449 |
| 1.25 | 120.45 | 1.25 | 0.0777 |
| 1.5 | 163.95 | 1.5 | 0.1058 |
| 2 | 270.23 | 2 | 0.1743 |
| 2.5 | 385.57 | 2.5 | 0.2487 |
| 3 | 595.34 | 3 | 0.384 |
| 3.5 | 796.21 | 3.5 | 0.5136 |
| 4 | 1025.2 | 4 | 0.6613 |
| 4.5 | 1315.2 | 4.5 | 0.8284 |
| 5 | 1611.12 | 5 | 1.0393 |
| 6 | 2326.6 | 6 | 1.5008 |
| 8 | 4031.82 | 8 | 2.5988 |

The dust and removed incrustations resulting from the cleaning are segregated in the vacuum filter collection unit. Once the mixture of air and abrasive particles has been blown through the pipe for a sufficient time, the compressor and vacuum pump are turned off, and an endoscope or profile plate test may be used to ensure that the pipe has been sufficiently cleaned. The pipe must be scaled to a coarse granulate roughness height in the range from 40–50 $\mu$m or 2–3 mils, in order to guarantee a good mechanical adhesion of the plastic in the pipe. Surface roughness is measured both at the intake and the outlet end of the pipe. If the test shows that the incrustations are still at a greater height than is recommended, abrasive particles and air are again blown through the pipe from one end and pulled from the other end by the vacuum pump until the desired surface smoothness is reached.

Once the pipe section from inlet 14 to outlet 16 has been cleaned, the outlet of the particle mixer or sand blasting machine 20 is disconnected from valve 26 and connected to inlet valve or tap 45 of the hose 34. The procedure is then repeated in order to clean the portion of the pipe extending from intake 36. Once this portion of the pipe is sufficiently clean, the outlet of the sand blasting machine 20 is disconnected from inlet valve 45 and connected to the inlet valve 46 of hose 35, and air and abrasive particles are blown into intake 38 and sucked out of the pipe system at outlet 16. This procedure is repeated for all pipe sections on a given floor or at a given level in a building, for example.

Any compressor and vacuum pump combination of sufficient capacity may be used for the pipe renovation system of FIGS. 1 and 2. Any suitable air compressor or equivalent device for supplying pressurized air may be used. For pipes of up to two inches in diameter, one suitable vacuum pump is the Jumbo Air Vacuum Pump (single, dual, or quad air) manufactured by Tornado Industries of Chicago, Ill., which has an external filter. For pipes of larger than two inch diameter, a Vac-Tron vacuum pump manufactured by Vac-Tron Equipment of Okahumpka, Fla., or equivalent, may be used. Suitable air heaters for use in the system are a flange circulation heater available from Gaumer Process Heaters, Systems, Controls of Houston, Tex. or an air process heater available from Vulcan Electric of Porter, Me. However, other types of heaters may alternatively be used.

A suitable coating material is then applied to the pipe, using the system as illustrated in FIG. 2. The system as connected in FIG. 2 is identical to that of FIG. 1, except that the sand blasting or revive machine 20 is replaced by lining mixer 60, with an inlet 62 for receiving the selected lining material. The coating material may be a synthetic resin or plastic. In an exemplary embodiment of the invention, the selected lining material was a two part epoxy material, such APL-2000[1] Protective (Barrier) Material available from American Pipe Lining, Inc. of San Diego, Calif., which is approved for use in water pipes. Alternatively, any suitable coating material which has an NSF 61 approval for water pipes may be used. One suitable mixer or machine for adding liquid epoxy to the air flow is the 10B Micro Piston Machine for pumping low to high viscosity liquids, manufactured by Integrated Dispensing Solutions of Woodland Hills, Calif. However, other mixers and dispensers for liquids such as epoxies may alternatively be used.

Prior to application of the epoxy coating to the pipe, a pressure test may be performed to determine whether there are any holes in the pipe, since otherwise the epoxy material could leak out of these holes, resulting in insufficient coverage. However, it has been found that the coating material will escape only in very small quantities if the holes are small, and will actually contribute towards sealing such holes, avoiding the need for using additional materials to seal any relatively small holes. In order to locate any larger holes which could be more of a problem, a pressure test may first be carried out following the pipe cleaning, using electronic or mechanical measuring devices as known in the pipe testing field. Alternatively, ultrasound may be used to locate leaks from the sound of escaping air. If only minor leaks are found, no repair is needed since the coating material itself will seal such leaks. If major leaks are discovered, a repair is performed prior to starting the pipe coating procedure.

Once it has been determined that there are no major leaks or all such leaks have been sealed, the pipe system is heated to a predetermined temperature prior to supplying epoxy material to coat the pipe. This temperature will give the epoxy better flow characteristics. The pipe system is heated with dehumidified, pre-clarified air supplied to the first intake 14 directly from air heater 18, while detecting the temperature at the intake with thermometer 50, and at the outlet with thermometer 55. The temperature of the pipe should be between 100°–120° F. during coating. Coating can commence when the temperature is not greater than 120° F. at the inlet and not less than 80° F. at the outlet end of the pipe.

When the pipe is at the right temperature, the epoxy components A and B can be mixed, suitably in a 70%/30% ratio. The mixed epoxy is introduced into the hose which is connected to the prepared pipe, by opening valves 22 and 26. At the other end of the pipe, the vacuum pump sucks or pulls the epoxy through the pipes. As in the cleaning step, pipe coating is carried out using the combination of the compressor 12 at the intake end and the vacuum pump 15 at the outlet end, both pushing and pulling the air and epoxy material through the pipe. This push and pull system supplies a high air volume and speed which transports the epoxy through the pipe quickly and evenly, reducing the risk of blockages. The high air volume, which will be equivalent to that illustrated in Table 1 above, causes an eddying core flow in the pipe that throws or presses the coating material against the inner wall of the pipe, while the air flow velocity will provide an even coating layer along the pipe. The method will reduce or eliminate mistakes as a result of poor epoxy distribution which may be caused by using only pressure or only vacuum to transport the epoxy, such as uneven thickness or missed areas.

A transparent pipe or tube attached at the outlet end 16 of the pipe shows when the epoxy has traveled all the way through the pipe. The air flow is then slowed to a minimum so that epoxy no longer travels through the pipe system. This helps the epoxy to dry and cure more quickly. Table 2 above allows the amount of coating material necessary to coat the pipe to be determined, ensuring that only small amounts escape from the other end of the pipe, protecting the environment and saving costs.

The amount of epoxy to be used is calculated using Table 2 below, based on the pipe material, length, and diameter.

TABLE 2

Pipe Lining Coating Distance Chart

| Pipe Size I.D. (inches) | 1-Cup 1 lb (feet) | 1 Gal. 10 lbs (feet) | 5 Gals. 50 lbs (feet) |
|---|---|---|---|
| Galvanized Iron Pipe: | | | |
| 6 | 3 | 30 | 150 |
| 5 | 3.5 | 35 | 175 |
| 4 | 4.5 | 45 | 225 |
| 3 | 6 | 60 | 300 |
| 2.5 | 7 | 70 | 350 |
| 2 | 9 | 90 | |
| 1.5 | 12 | 120 | |
| 1.25 | 14 | 140 | |
| 1 | 18 | 180 | |
| 0.75 | 24 | 240 | |
| 0.5 | 36 | 360 | |

| Pipe Size O.D. (inches) | 1-Cup 1 lb (feet) | 1 Gal. 10 lbs (feet) |
|---|---|---|
| Copper Pipe: | | |
| 2 | 9.5 | 95 |
| 1.5 | 13 | 130 |
| 1.25 | 16 | 160 |
| 1 | 21 | 210 |
| 0.75 | 28 | 280 |
| 0.5 | 48 | 480 |

Once the calculated amount of epoxy has been supplied to the pipe and the epoxy material is seen at the clear pipe connected to pipe end 16, the lining mixer is turned off and the air flow is reduced. The procedure is repeated for all pipe sections, connecting the lining mixer in turn to the intake 36 and 38, and supplying sufficient epoxy to coat that section of the pipe. The thermostats will ensure that the pipes are maintained at a sufficiently high temperature during the entire procedure, by controlling the heater control unit to heat the air if the detected temperature falls below a predetermined level. Once all pipe sections are coated, the lining mixer is turned off, and the system is left for 24 hours to allow the epoxy to dry and cure. After 24 hours, the epoxy will be hardened enough to use the pipe.

After the epoxy layer has hardened, an endoscope may be used to determine whether the pipe system has been completely and evenly coated. An ultrasound device may be used in a known manner to determine the thickness of the epoxy coating layer. A pressure test is also performed to ensure that there are no remaining leaks in the pipe.

Figure 4:
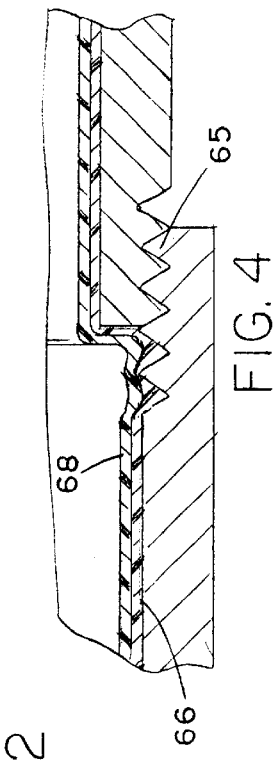
FIG. 4 is a cross-section similar to FIG. 3 illustrating application of a second layer of coating material.
Figure 3:
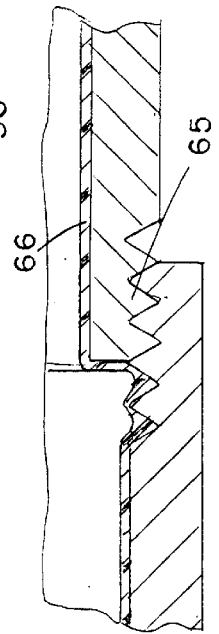
FIG. 3 is a cross-section through part of a pipe wall at a junction illustrating the application of a first layer of a coating material.

In an exemplary embodiment of the invention, two layers of epoxy are applied to the pipe, to ensure that any sharp edges are sufficiently coated, for example at a pipe union 65 as illustrated in FIGS. 3 and 4. FIG. 3 illustrates the connection or union of two pipe ends by a screw threaded engagement between the pipe ends, with a single layer 66 of epoxy material applied to the inside of the pipe and across the union. FIG. 4 illustrates the application of a second layer 68 of epoxy. After the second coating layer is applied, the interior of the pipe will be relatively smooth and any sharp edges, such as the exposed screw threads at the junction, will be sufficiently coated.

After the epoxy layer or layers have hardened, the pressure test has been performed, and the coating thickness and uniformity has been tested, the connectors between the renovation system and the pipe system 10 are removed, and the armatures are reinstalled at the pipe ends. The pipes are then operational.

In an exemplary embodiment of the invention, various quality assuring tests may be carried out during the pipe renovating process. As discussed above, pressure tests are carried out at various points before, during, and after the renovation. The pipes are all coated with epoxy material twice, and the coating is then checked for thickness by ultrasonic means, and for consistency by an endoscope. Endoscopy may also be carried out to check each cleaning step. For cleaning a water pipe, the water quality may be checked both before and after the renovation.

The pipe renovating method and system of this invention may be used for either installed or non-installed pipes, and can be used to renovate many types of pipes, including water pipes, gas pipes, sewer pipes, chemical manufacturing plant pipes, and the like. Unlike prior art pipe renovating methods which could not coat and clean large diameter pipes effectively, this method can coat large diameter pipes of 10 inch or more. It has been found that a 10 inch diameter pipe of 120 feet in length can be cleaned and coated within one hour. Unlike this system, which uses a push and pull (pressure and vacuum) technique to move both the abrasive cleaning material and the coating material through the pipe, the prior art uses only pressure or only vacuum, such that air flow is reduced at angles, elbows, valves, partial blockages of the pipe, and the like. In this invention, even if such blockages or impediments are present, the air will be pulled through them by the vacuum pump while still being pushed from the other side by the compressor.

The method and system of this invention helps to avoid or delay the need for a complete or partial re-piping of a pipe system. This considerably reduces expense as well as the down time during renovation. With this method, all that needs to be done is to dismount the devices or instruments at each inlet/outlet of the pipe system, to connect the cleaning and coating system, and to re-connect the devices and instruments after cleaning and coating is complete. The combination of pressure at one end of the pipe section being renovated with vacuum at the other end produces a much more even and constant flow velocity through the pipe, reducing the effect of partial blockages or impediments due to pipe fittings, elbows, bends, or reduction of pipe diameter due to accretions accumulated on the inner surface of a pipe. Even though the pressure at both the intake side and the outlet side may be well below the maximum pressure permitted for safety purposes, for example 15 PSI, particles and liquids can still be transported at very high speed, while reducing the risk of production of leaks due to high pressure in the pipe.

It should be understood that the supply of abrasive material and coating material may be pumped in at either end of a pipe section to be cleaned, not only in the direction illustrated. Although the cleaning and coating material flow is in the same direction in the illustrated embodiment, this is not essential and cleaning material may flow in one direction while the subsequent flow of coating material may occur in the opposite direction, simply by switching the location of the vacuum pump and compressor. The transport medium in the illustrated embodiment is air, although other gases may be used in alternative embodiments of the invention.

Although an exemplary embodiment of the invention has been described above by way of example only, it will be understood by those skilled in the field that modifications may be made to the disclosed embodiment without departing from the scope of the invention, which is defined by the appended claims.

I claim:

1. A pipe renovating method, comprising the steps of:
   pumping a mixture of pressurized gas and particles of abrasive material into a first end of a pipe;
   simultaneously applying suction to a second end of the pipe;
   whereby the mixture is pumped in at the first end and sucked out at the second end of the pipe so as to be conveyed alone the pipe with the abrasive particles cleaning the inner surface of the pipe;
   determining when the inner surface of the pipe has been sufficiently cleaned by the abrasive materials; and
   coating the inner surface of the cleaned pipe with coating material;
   the step of coating the inner surface of the pipe comprises pumping a mixture of gas and liquid coating material into one end of the pipe while applying suction to the other end of the pipe.

2. The method as claimed in claim 1, wherein suction is applied with a vacuum pump.

3. The method as claimed in claim 1, including the step of determining the quantity of coating material required to coat the inner surface of the pipe to a predetermined depth based on the length and diameter of the pipe, and terminating the coating step after the predetermined amount of material has been supplied to the pipe and the coating material is observed at the second end of the pipe.

4. A pipe renovating method, comprising the steps of:
   pumping a mixture of pressurized gas and particles of abrasive material into a first end of a pipe;
   simultaneously applying suction to a second end of the pipe;
   whereby the mixture is pumped in at the first end and sucked out at the second end of the pipe so as to be conveyed alone the pine with the abrasive particles cleaning the inner surface of the pipe;
   determining when the inner surface of the pipe has been sufficiently cleaned by the abrasive materials;
   coating the inner surface of the cleaned pipe with a first layer of coating material; and
   applying a second layer of coating material to the inner surface of the pipe.

5. A pipe renovating method, comprising the steps of:
   drying a pipe by pumping heated air into a first end of the pipe while applying suction at a second end of the pipe;
   after the pipe has been dried, pumping a mixture of pressurized gas and particles of abrasive material into the first end of the pipe;
   simultaneously applying suction to the second end of the pipe;
   whereby the mixture is pumped in at the first end and sucked out at the second end of the pipe so as to be conveyed along the pipe with the abrasive particles cleaning the inner surface of the pipe.

6. The method as claimed in claim 5, including the steps of determining when the inner surface of the pipe has been sufficiently cleaned by the abrasive material particles and subsequently coating the inner surface of the cleaned pipe with a coating material.

7. The method as claimed in claim 6, wherein the coating material is an epoxy resin.

8. The method as claimed in claim 6, including the step of heating the pipe to a predetermined temperature prior to coating the pipe, the heating step comprising pumping heated air into the first end of the pipe and applying suction at the second end of the pipe until first and second predetermined air temperatures are detected at the first and second ends, respectively, of the pipe, and the coating step commencing as soon as said predetermined air temperatures are reached.

9. The method as claimed in claim 8, wherein the first predetermined air temperature is in the range of 100° to 120° F.

10. The method as claimed in claim 8, wherein the second predetermined air temperature is at least 80° F.

11. A pipe renovating method, comprising the steps of:
    pumping a mixture of pressurized gas and particles of abrasive material into a first end of a pipe;
    simultaneously applying suction to a second end of the pipe;
    whereby the mixture is pumped in at the first end and sucked out at the second end of the pipe so as to be conveyed along the pipe with the abrasive particles cleaning the inner surface of the pipe; and
    monitoring the pressure in the pipe and relieving the pressure if the detected pressure is above a predetermined safety level.

12. A pipe renovating method, comprising the steps of:
    pumping a mixture of pressurized gas and particles of abrasive material into a first end of a pipe;
    simultaneously applying suction to a second end of the pipe;
    whereby the mixture is pumped in at the first end and sucked out at the second end of the pipe so as to be conveyed along the pipe with the abrasive particles cleaning the inner surface of the pipe;
    determining when the inner surface of the pipe has been sufficiently cleaned by the abrasive materials;
    testing the pipe for any leaks; and
    coating the inner surface of the cleaned pipe with coating material.

13. A pipe renovating method, comprising the steps of:

pumping a mixture of pressurized gas and particles of abrasive material into a first end of a pipe;

simultaneously applying suction to a second end of the pipe;

whereby the mixture is pumped in at the first end and sucked out at the second end of the pipe so as to be conveyed alone the pipe with the abrasive particles cleaning the inner surface of the pipe;

determining when the inner surface of the pipe has been sufficiently cleaned by the abrasive materials;

coating the inner surface of the cleaned pipe with coating material; and determining the coating layer thickness after the pipe coating step is complete.

14. A system for renovating pipes, comprising:

a supply of pressurized gas, the gas supply having an outlet;

a first mixing machine having a first inlet connected to the outlet of the gas supply, a second inlet for supply of abrasive particles to the machine for mixing with the gas, and an outlet for the mixture of pressurized gas and abrasive particles;

a first hose for selectively connecting the mixing machine outlet to a first end of a pipe;

a vacuum pump; and a second hose having a first end connected to the vacuum pump and a second end for selective connection to a second end of the pipe, whereby the mixture of gas and abrasive particles is blown into the first end of the pipe and sucked out at the second end of the pipe in order to clean the pipe.

15. The system as claimed in claim 14, including a gas heater connected between the pressurized gas supply and the mixing machine, the heater having an inlet for receiving gas and an outlet for heated gas.

16. The system as claimed in claim 15, including a valve assembly for selectively connecting the mixing machine in line with the pressurized gas supply and heater and for selectively disconnecting the mixing machine and connecting the heater outlet directly to the first end of a pipe.

17. The system as claimed in claim 15, including a first thermometer connected to the first hose for measuring the temperature of air moving through the hose adjacent a first end of a pipe connected to the hose, and a second thermometer connected to the second hose for measuring the temperature of air moving through the hose adjacent a second end of a pipe connected to the second hose.

18. The system as claimed in claim 4, including a thermostat for controlling the heater based on the temperature detected by at least the first thermometer.

19. The system as claimed in claim 14, including a second mixing machine for providing a supply of liquid coating material mixed with gas, the second mixing machine having a first inlet for pressurized gas, a second inlet for coating material, and an outlet, and a valve assembly for selectively connecting the second mixing machine in line between the pressurized gas supply and a first inlet to a pipe in place of the first mixing machine.

20. The system as claimed in claim 14, wherein the supply of pressurized gas comprises an air compressor.

21. The system as claimed in claim 14, including at least one pressure control monitor for monitoring the pressure in the system and for relieving the pressure if a predetermined safety level is exceeded.

\* \* \* \* \*